United States Patent [19]
Chappaz et al.

[11] Patent Number: 5,779,963
[45] Date of Patent: Jul. 14, 1998

[54] MANUFACTURING PROCESS OF AN INSULATOR

[75] Inventors: Pierre Chappaz, Venon; Yvan Fedorenko, Poisat; Jacques Quenin, Gieres; François Trichon, Meylan; Bernard Yvars, Tullins, all of France

[73] Assignee: Schneider Electric SA, Billancourt, France

[21] Appl. No.: 715,459

[22] Filed: Sep. 18, 1996

[30] Foreign Application Priority Data

Oct. 4, 1995 [FR] France .................... 95 11888

[51] Int. Cl.$^6$ ................. B29C 45/14; B29C 45/16
[52] U.S. Cl. ...................... 264/254; 264/250
[58] Field of Search ................ 264/250, 328.14, 264/328.16, 255, 259, DIG. 65, 254

[56] References Cited

U.S. PATENT DOCUMENTS

| | | | |
|---|---|---|---|
| 4,243,628 | 1/1981 | Herold | 264/275 |
| 4,246,696 | 1/1981 | Bauer et al. | 29/631 |
| 4,312,123 | 1/1982 | Wheeler . | |
| 4,702,873 | 10/1987 | Kazcerginski | 264/135 |
| 5,223,315 | 6/1993 | Katsura et al. | 428/36.92 |
| 5,516,477 | 5/1996 | Johnson et al. | 264/221 |
| 5,523,038 | 6/1996 | Kuneida et al. | 264/135 |

FOREIGN PATENT DOCUMENTS

| | | |
|---|---|---|
| 2672423 | 8/1992 | France . |
| 2657051 | 6/1978 | Germany . |
| 2746870 | 11/1978 | Germany . |
| 1549049 | 7/1979 | United Kingdom . |
| 80/01621 | 8/1980 | WIPO . |

*Primary Examiner*—Jan H. Silbaugh
*Attorney, Agent, or Firm*—Michael J. Femal; Richard J. Graefe; Larry I. Golden

[57] ABSTRACT

A process of manufacturing an insulator having a central core and an insulating body fitted tightly around the central core includes interposing a flexible coating layer between a part of the central core and the insulating body. The flexible coating layer fills in shrinkage cavities and compensates for a retraction effect caused by injected material used in forming the insulating body. The insulating body is achieved by overmolding the central core previously coated with the flexible coating layer with an injected insulating resin such as a thermoplastic or thermosetting resin. The insulator could be used as a capacitive divider or bushing insulator.

11 Claims, 4 Drawing Sheets

MANUFACTURING PROCESS OF AN INSULATOR

BACKGROUND OF THE INVENTION

The present invention relates to a manufacturing process of an insulator, notably an insulator for a capacitive divider or a bushing insulator, comprising a central core and an insulating body fitted tightly around said central core, a flexible coating layer being interposed between at least a part of the central core and the insulating body.

It also relates to an insulator achieved according to this process, notably an insulator for a capacitive or resistive divider or a bushing insulator, comprising a central core and an insulating body fitted tightly around said central core.

Insulators of this type are usually manufactured according to a process which consists in moulding an epoxy resin insulating body around a central core constituted, for example for a capacitive divider, by a ceramic rod coupled at both ends to two conductors respectively called high voltage conductor and low voltage conductor.

This process happens to be costly due to the cost of implementation, which has the consequence of making the price of these components relatively high.

SUMMARY OF THE INVENTION

The present invention proposes to achieve this type of insulators at an appreciably lower cost than that which is currently the case, by faster manufacturing, with less expensive materials and toolings, while keeping the dielectric insulation qualities.

For this purpose, the manufacturing process according to the invention is characterized by the following stages:

the flexible coating layer is achieved by overmoulding of at least a part of the central core with an elastomeric material adhering to the core, said layer being notably formed by flexible polyurethane, or by silicone, and presenting a thickness comprised between 0.75 and 1.5 mm;

the insulating body is achieved by overmoulding of said central core previously coated in said flexible coating layer with an insulating resin injected under pressure, so as to compress the flexible coating layer, which subsequently fills in the shrinkage cavities to compensate the retraction effect of the injected material, notably at the level of the fins of the insulating body;

the resin of said body is a thermoplastic or thermosetting resin, having a retraction on moulding of more than 1%.

According to a feature of the invention, the flexible coating layer is obtained by casting said elastomeric material in a mould preheated to a temperature higher than 30° C., and preferably about 60° C.

According to another feature of the invention, the central core previously coated in the flexible coating layer is preheated before injection of the resin, the preheating temperature being greater than 50° C. and preferably about 70° C.

The invention also relates to an insulator comprising a central core, an insulating body fitted tightly around said central core, a flexible coating layer interposed between at least a part of said central core and the insulating body, said flexible coating layer being made of flexible polyurethane or of silicone, and presenting a thickness comprised between 0.75 and 1.5 mm. The insulating body is made of polypropylene or any other insulating resin injected under pressure, having a retraction on moulding of more than 1%.

BRIEF DESCRIPTION OF THE DRAWINGS

The present invention will become more clearly apparent with reference to the description of a preferred embodiment given as a non-restrictive example only and to the accompanying drawings in which.

DETAILED DESCRIPTION OF THE PREFERRED EMBODIMENT

Figure 1:
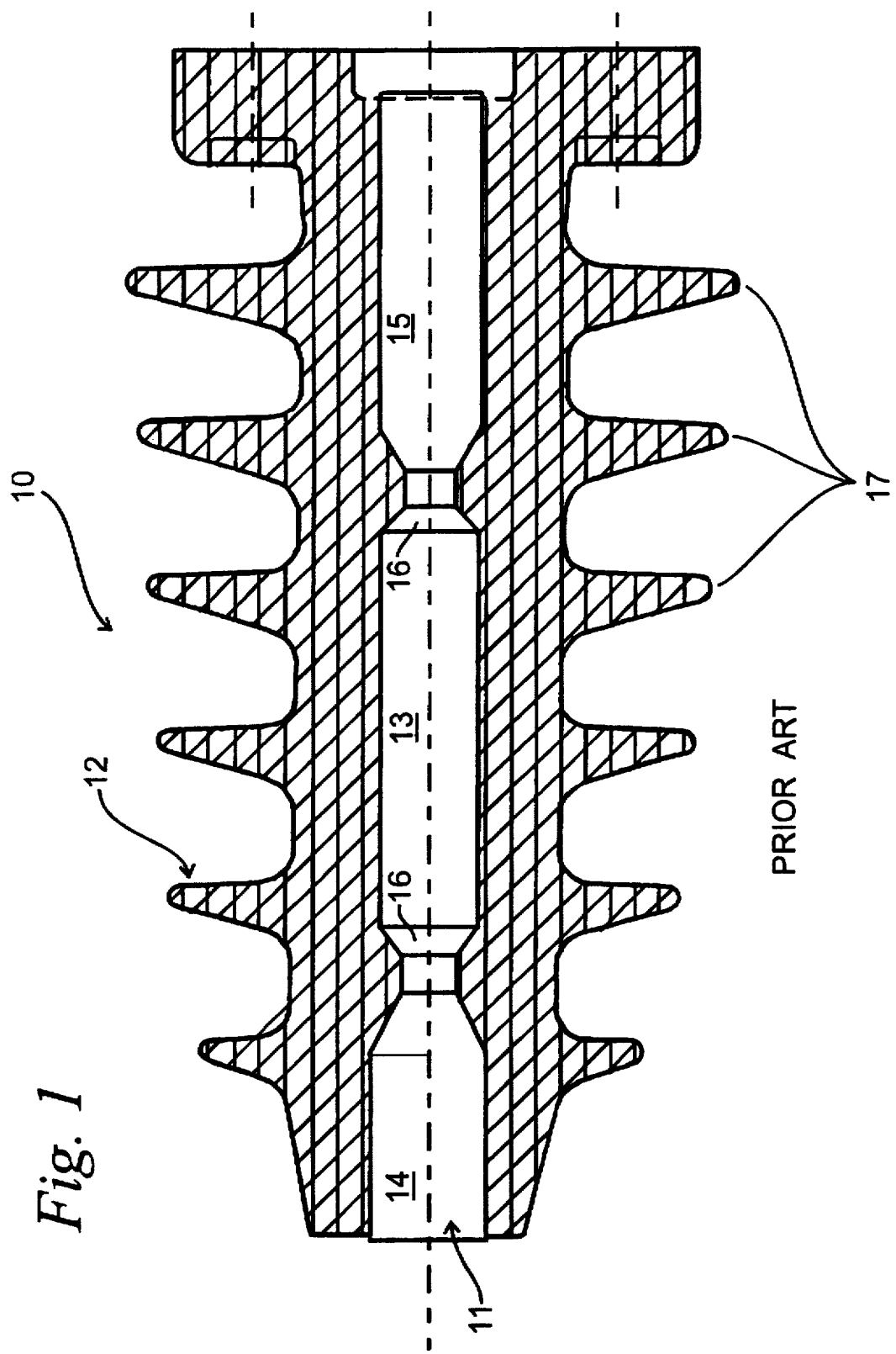
FIG. 1 represents an axial sectional view of a known insulator illustrating the prior art.

With reference to FIG. 1, the insulator 10 according to the prior art as represented mainly comprises a central core 11 surrounded by an insulating body 12. The central core 11 is composed of an insert formed by a ceramic rod 13 occupying a central position and which is coupled via its two ends to two conductors respectively 14 and 15. The conductor 14 is, in this case which represents a capacitive divider, the high voltage conductor, and the conductor 15 is the low voltage conductor. The connection between the ceramic rod and the conductors is achieved by brazing metal caps 16 onto the ends of the ceramic rod. The insulating body 12 is a part made of epoxy resin overmoulded onto the central core 11. It comprises a series of fins 17 designed to increase the creepage distance of the insulator.

This construction principle is currently applied to all devices in which there is a need for dielectric tightness, notably capacitive dividers, resistive dividers or bushing insulators. To increase the dielectric performances of the insert alone or in order to extend the conditions of use for example in polluted, wet or low-pressure environments, this insert is coated with an insulating material. The nature of the insert may be made of metallic, ceramic, or plastic material. In the case described above, where the insert is made of ceramic, this insert acts as a capacitor. The dielectric strength of the ceramic is sufficient to withstand all the voltage surges which may be applied to it throughout its life-time. There is however a risk of flashover of the ceramic in the air, since the dielectric resistance of air is too low to withstand such voltage surges over such a short distance.

In addition, when the insert is placed in the ambient air, conducting particles (dust) may be deposited on the surface of the ceramic and may thereby be the cause of a flashover in the absence of a voltage surge. It is to overcome these problems that the insert is coated in an insulating material, which presents the following advantages:

a. by suitable dimensioning, the flashover distance of the assembly in the air is increased so that the assembly can withstand all the possible voltage surges;

b. by suitable dimensioning of the outline of the insulating body, defining the creepage distances, the risk of decrease of the dielectric withstand on flashover can be eliminated even in the case of deposition of conducting particles;

c. by a judicious choice of the material composing the insulating body, the insulator is rendered suitable to withstand mechanical stresses that the central body is not able to withstand, notably because the junction zones between the metallic cylinders which constitute the conductors and the ceramic rod are fragile.

The major problem to be overcome as far as coating of the insert is concerned is that the coating material has to stick on the insert and achieve tightness at the level of its interface with the ceramic so that triggering of a flashover cannot occur.

In fact, as soon as the tightness is not complete, air is present at the level of this zone, which can reduce the dielectric withstand of the assembly and reduce its life-time.

In a conventional manner, the coating of the insert is made of thermosetting resin, notably epoxy resin, for high voltage applications. Nevertheless, insulating bodies made of silicone or polyurethane can also be used. All these materials are chosen because they generally stick to the insert very well, which guarantees a good dielectric tightness.

In practice, the assembly of the conductors and ceramic rod, in other words the central core, is preheated to more than 140° C. and is then placed in a mould heated to a temperature of about 80° C. The epoxy resin is injected into the mould at low pressure, i.e. about 1 to 2 bars, to progressively fill the space between the internal wall of the mould and the central core. The resin has a temperature close to 70° C. Due to the difference of temperature between the wall of the mould and the central core, polymerization takes place in priority along the central core. This results simultaneously in effective sticking of the resin onto the central core and notably onto the ceramic insert and in shrinking due to the retraction of the resin which reticulates. A good dielectric tightness is thereby obtained.

The process does however present drawbacks. The presence of bubbles is not totally excluded, these bubbles being able to be the seat of partial discharges. These bubbles can be due to retraction of the material in the course of the reticulation process or to air being imprisoned when moulding is performed. The partial discharges may result in premature ageing of the insulator. All the manufactured parts have to be checked by subjecting them to partial discharge tests, which has the consequence of increasing the duration of the manufacturing cycle. Moreover, this manufacturing cycle is long, since it lasts about 20 minutes, which means that the manufacturer has to multiply the number of toolings thus compensating for the length of the production cycle by the use of multiple-print toolings.

Figure 2:
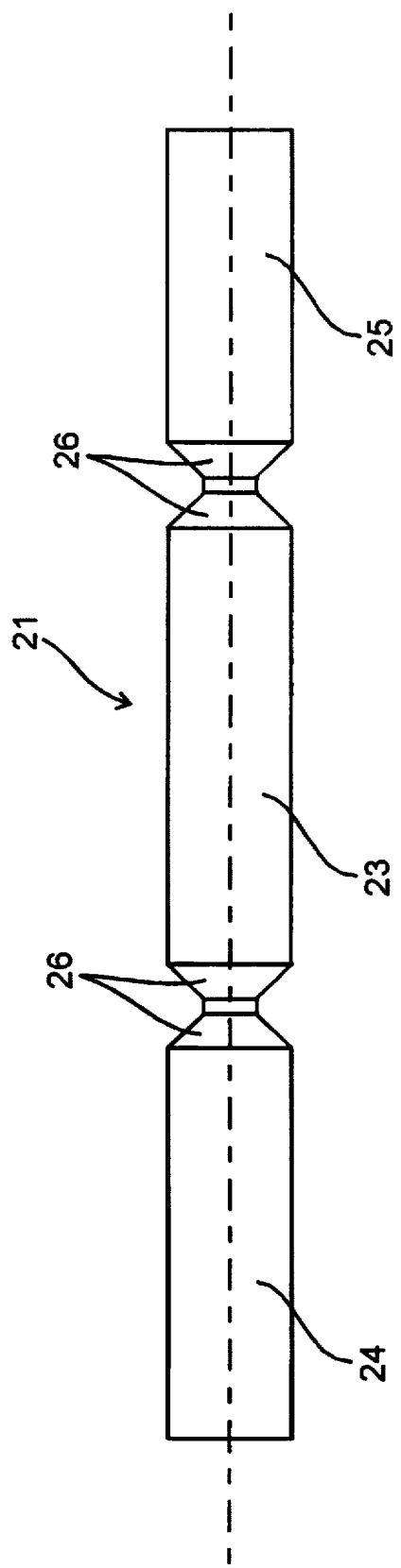
FIG. 2 represents a side view of the central core of an insulator according to the invention.

FIG. 2 represents more specifically the central core 21 of an insulator. This central core is identical to the one described with reference to FIG. 1 and corresponds to an insulator of the prior art and to the one according to the invention which will be described hereinafter with reference to FIG. 4. It comprises an insert 23 constituted by a ceramic rod and two conductors 24 and 25 formed by two metallic cylinders. These three components are assembled by means of frustum-shaped end parts 26, the ceramic-metal connection being achieved by brazing or any assembly process enabling the current to flow. The ceramic insert constitutes the high voltage capacitor. The conductor 24, which corresponds to the high voltage input, is preferably made of coated steel, and the conductor 25, which corresponds to the low voltage, is preferably made of aluminium or brass. The end parts 26 are preferably made of brass able to be brazed onto the ceramic.

Figure 3:
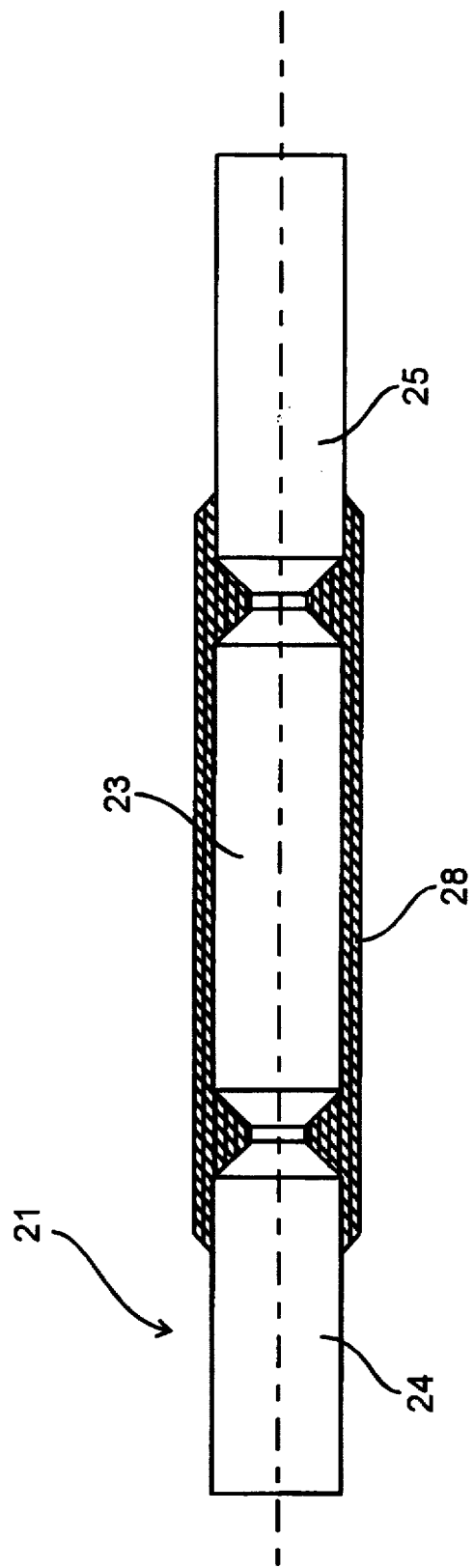
FIG. 3 represents a side view of the central core of an insulator according to the invention, illustrating a first phase of the process according to the invention.

FIG. 3 illustrates the next stage of the manufacturing process of the insulator according to the invention. This stage consists in coating the insert formed by the ceramic rod 23 with a flexible coating layer 28. This operation is performed by overmoulding by means of an elastomeric material such as for instance a flexible polyurethane, a silicone or similar. This overmoulding can be achieved in the form of a moulding by casting in a preheated mould, heated to a temperature higher than 30° C. and preferably about 60° C., made of bi-component polyurethane of a hardness lower than 80 shore A. The coated rod, as shown in the figure, with end sections which extend onto the conductors, is removed from the mould and the casting and degassing sprues are razed.

Figure 4:
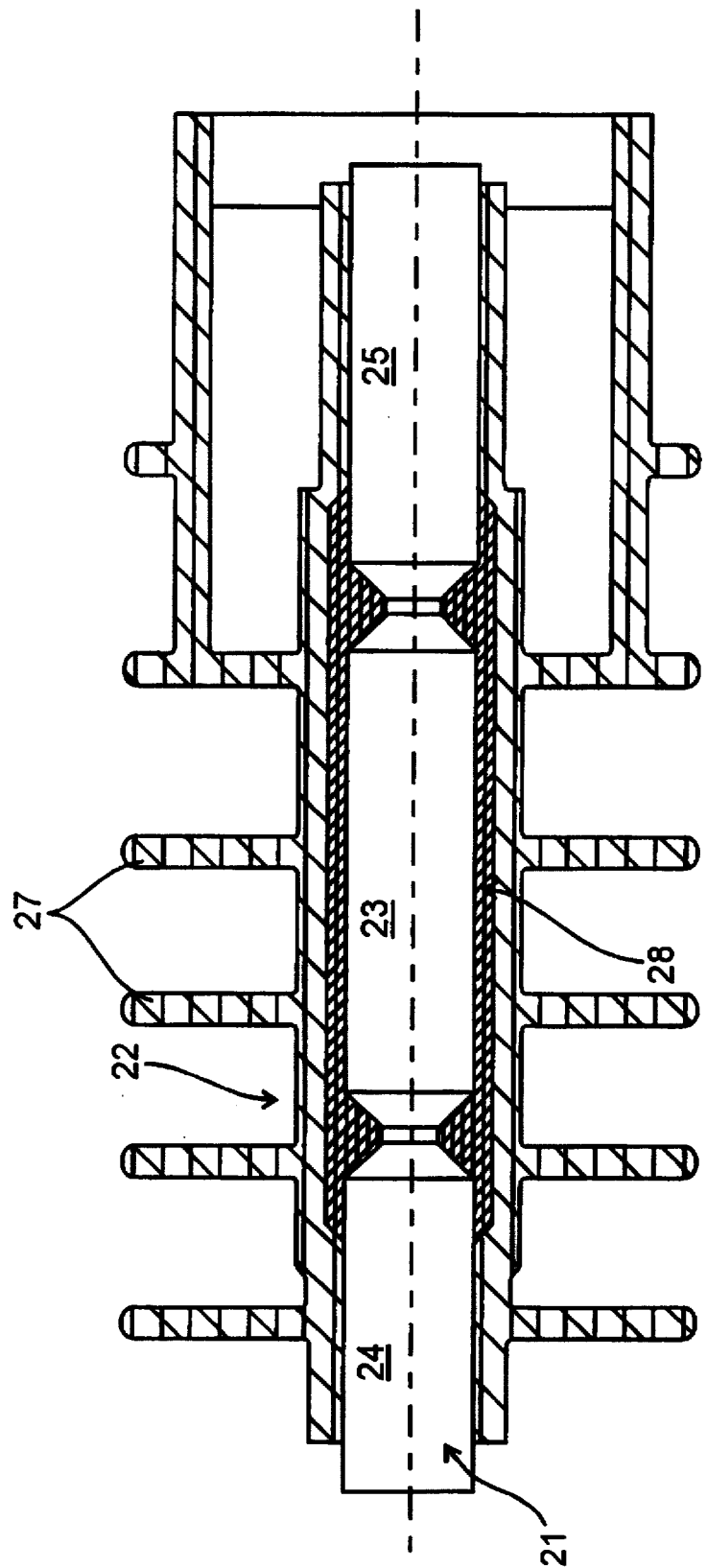
FIG. 4 represents an axial sectional view of a capacitor insulator according to the invention.

The next stage of this manufacturing process, illustrated by FIG. 4, consists in overmoulding the central core previously coated with the flexible coating layer 28. This component is preheated to a temperature greater than 50° C. and preferably about 70° C., and then placed in an injection mould whose cavity has the shape of the insulating body 22. The material used to achieve the insulating body is an injectable thermoplastic resin such as polypropylene for example.

Another injected insulating resin with a low cycle time, even a thermosetting resin, can naturally be used, notably polyester. This material is injected at a pressure greater than 50 bars and preferably about 100 bars for a duration of about 5 seconds. The holding pressure is about 400 bars and the holding time is about 20 seconds. The temperature of the injected material is about 180° to 200° C. for the case of the polypropylene.

After this holding time, the mould is opened and the moulding sprues are cut off.

As for the prior art insulator, the insulating body 22 increases the creepage distances.

Overmoulding of the insert to achieve the flexible coating layer 28 ensures the dielectric tightness of the insulator. Finally, the mechanical strength and fixing of the insulator are also achieved by the insulating body.

When the material composing the insulating body is injected at high pressure, the flexible coating layer 28 is compressed. The injected material changing from a fluid state to its solid state results in a retraction in the form of shrinkage cavities at the level of the fins 27 of this body and a reduction of the internal diameter of the insulating body 22. Due to its flexibility, the flexible coating layer fills the shrinkage cavities and compensates the retraction effect of the injected material, because it has been compressed on injection and the reduction of the internal diameter of the body compresses the elastomer, enabling the cavities created by retraction at the level of the fins to be filled in. The thickness of the flexible coating layer must be appreciably comprised between 0.75 and 1.5 mm, and the retraction of the injected material must be greater than 1%.

We claim:

1. A manufacturing process of an insulator having a central core and an insulating body fitted tightly around said central core, said process comprising:

A. forming the central core by attaching a first conductor to one end of a rod shaped insert and attaching a second conductor to another end of the insert;

B. overmoulding of at least a part of the central core with an elastomeric material adhering to the core to form a flexible coating layer, said overmoulding being carried out by casting in a first mould to form said layer coating the insert and presenting a thickness between 0.75 and 1.5 mm; and C. overmoulding said central core previously coated in said flexible coating layer with an insulating resin material injected under pressure into a second mould to form the insulating body and to compress the flexible coating layer, which flexible coating layer subsequently fills in shrinkage cavities created by retraction of the injected insulating resin material as it changes from a fluid state to a solid state, to compensate for said retraction, the insulating material having a retraction on moulding of more than 1%.

2. The process according to claim 1 wherein the flexible coating layer is obtained by casting said elastomeric material in said first mould preheated to a temperature higher than 30° C.

3. The process according to claim 2 wherein the central core previously coated in the flexible coating layer is preheated before injection of the resin, the preheating temperature being greater than 50° C.

4. The process according to claim 3 wherein the elastomeric material forming the flexible coating layer is a flexible polyurethane or silicone based material.

5. The process according to claim 4 wherein said first mould is preheated to a temperature about 60° C.

6. The process according to claim 5 wherein the injected insulating resin material is a thermoplastic or thermosetting resin.

7. The process according to claim 6 wherein the injected insulating resin material is polypropylene.

8. The process according to claim 6 wherein the injected insulating resin material is polyester.

9. The process according to claim 8 wherein the central core previously coated in the flexible coating layer is preheated before injection of the resin to a temperature about 70° C.

10. The process according to claim 9 wherein the central core is a capacitive divider formed by attaching said first and second conductors to opposite ends of a ceramic rod insert.

11. The process according to claim 9 wherein the central core is a bushing insulator formed by attaching said first and second conductors to opposite ends of a plastic rod insert.

* * * * *